United States Patent [19]

Tsutsumi et al.

[11] Patent Number: 5,473,299
[45] Date of Patent: Dec. 5, 1995

[54] HORIZONTAL LINEARITY CORRECTION COIL

[75] Inventors: Yutaka Tsutsumi; Isago Konno, both of Neyagawa; Takanobu Ito, Tsu, all of Japan

[73] Assignee: Matsushita Electric Industrial Co., Ltd., Osaka, Japan

[21] Appl. No.: 351,138

[22] Filed: Nov. 30, 1994

[30] Foreign Application Priority Data

Dec. 13, 1993 [JP] Japan .................. 5-311655

[51] Int. Cl.⁶ .................................. H01F 17/04
[52] U.S. Cl. .................. 336/110; 315/400; 335/227; 336/181
[58] Field of Search .................. 335/210, 227, 335/213; 315/370, 399, 400; 336/110, 180, 181

[56] References Cited

U.S. PATENT DOCUMENTS

| | | |
|---|---|---|
| 3,434,001 | 3/1969 | Okuda .................. 336/110 |
| 3,681,725 | 8/1972 | Ikeuchi . |
| 3,806,853 | 4/1974 | Kikuchi . |
| 3,863,184 | 1/1975 | Thibodeau et al. . |
| 4,713,589 | 12/1987 | Kashiwagi . |
| 5,117,215 | 5/1992 | Kakehashi et al. . |

FOREIGN PATENT DOCUMENTS

| | | |
|---|---|---|
| 63-124714 | 8/1988 | Japan . |
| 2157087 | 10/1985 | United Kingdom . |
| 2259190 | 3/1993 | United Kingdom . |

*Primary Examiner*—Thomas J. Kozma
*Attorney, Agent, or Firm*—Stevens, Davis, Miller & Mosher

[57] ABSTRACT

A horizontal linearity correction coil is used for a television receiver having a cathode ray tube of a wide deflection angle and has excellent productivity, quality and loading respectively. The ferrite magnetic core has the flanges at both ends and the middle and has a hollow shape at one winding core portion of the ferrite magnetic core. The windings are wound around the winding core portions and the permanent magnets are combined to both end flanges.

5 Claims, 6 Drawing Sheets

HORIZONTAL LINEARITY CORRECTION COIL

BACKGROUND OF THE INVENTION

1. Field of the Invention

The present invention relates to a horizontal linearity correction coil to be used for a television receiver or the like.

2. Description of the Related Art

In a television receiver using a cathode ray tube which has a wide deflection angle of 112 degrees and which has a plane fluorescent screen called a flat face, when a lattice-shaped cross hatch pattern 1 is displayed on the screen as shown in FIG. 4, a distortion occurs to widen the distance in the horizontal direction of the screen as shown by $1a$ and $1b$ at portions between the center and the left end portion and between the center and the right end portion of the screen.

As shown in FIG. 5, a horizontal deflection current $2a$ is linear with respect to time t (that is, this current shows a constant change rate with the change of time), and cathode rays (electron beams) of a cathode ray tube 3 shown in FIG. 6 are electromagnetically deflected at a constant angle ($\theta_{a1}=\theta_{a2}=\theta_{a3}=\theta_{a4}$). Since the fluorescent screen of the cathode ray tube 3 is plane, the displayed positional dimensions of the fluorescent screen of the cathode ray tube 3 become $l_{a1} \neq l_{a2} \neq l_{a3} \neq l_{a4}$.

In order to correct this distortion, first and second linearity correction coils 6 and 7 are connected in series to a horizontal deflection coil 5 which is connected to a horizontal deflection output circuit 4 and a capacitor 8 is connected to this second horizontal linearity correction coil 7 so as to form a horizontal defection circuit as the circuit is shown in FIG. 7.

FIG. 8 shows the electrical characteristics of the first and second horizontal linearity correction coils 6 and 7. The characteristic of the first horizontal linearity correction coil 6 is designated by $L_6$ and the characteristic of the second horizontal linearity correction coil 7 is designated by $L_7$. The characteristic $L_6$ of the first horizontal linearity correction coil 6 shows a peak value of inductance in the middle between "0" of a horizontal deflection current $I_H$ and a maximum value at the minus side. The characteristic $L_7$ of the second horizontal linearity correction coil 7 shows a peak value of inductance in the middle between "0" of the horizontal deflection current $I_H$ and a maximum value at the plus side. Thus, the peak value of the characteristic $L_6$ is larger than the peak value of the characteristic $L_7$.

In order to obtain a characteristic designated by $L_8$, by combining the characteristic $L_6$ and the characteristic $L_7$, the first and second horizontal linearity correction coils 6 and 7 are connected in series, and the horizontal deflection current $2a$ is corrected as shown by $2b$ as shown in FIG. 5 so that the change rate of the horizontal deflection current with respect to time is changed. Particularly, the change rates of the horizontal deflection current become smaller at the positions of the intermediate portions between the center portion and the left end portion and between the center portion and the right end portion of the fluorescent screen of the cathode ray tube. The electromagnetic deflection angles with respect to the time change of the cathode rays (electron beams) of the cathode ray tube 3 become $\theta_{b1} \neq \theta_{b2} \neq \theta_{b3} \neq \theta_{b4}$. However, the positional dimensions displayed on the fluorescent screen of the cathode ray tube 3 become $l_{b1}=l_{b2}=l_{b3}=l_{b4}$, so that the distortion is corrected as shown in FIG. 9. Consequently, when the lattice-shaped cross hatch pattern 1 is displayed on the screen, a constant distance can be maintained as shown in FIG. 10.

The first and second horizontal linearity correction coils 6 and 7 have the structures as shown in FIG. 11 and FIG. 12, respectively.

That is, the first horizontal linearity correction coil 6 comprises a first ferrite magnetic core 9 of drum type, a first winding 11 wound around the first ferrite magnetic core 9 and a first ferrite magnet 13 combined at one of flanges $9a$ of the first ferrite magnetic core 9. Similarly, the second horizontal linearity correction coil 7 comprises a second ferrite magnetic core 10 of drum type, a second winding 12 wound around the second ferrite magnetic core 9 and a second ferrite magnet 13 combined at one of flanges $10a$ of the second ferrite magnetic core 9.

The first horizontal linearity correction coil 6 shown in FIG. 11 is structured to form the first ferrite magnetic core 9 with the diameter of a first winding core portion $9b$ at the rate of 0.33 to 0.35 of the diameter of the first flange $9a$. The second horizontal linearity correction coil 7 shown in FIG. 12 is structured to form the second ferrite magnetic core 10 with the diameter of a second winding core portion $10b$ at the rate of not larger than 0.3 of the diameter of the second flange $10a$ so that a magnetic saturation is generated in small inductance.

SUMMARY OF THE INVENTION

As described above, according to the conventional horizontal linearity correction coil, the two horizontal linearity correction coils 6 and 7 are connected in series to obtain the combined characteristic. Therefore, it is necessary to make small the variations of the respective characteristics of the horizontal linearity correction coils 6 and 7 and to optimize the pairing of the two, so that substantial manpower is required for production management and inspection of the characteristics, with extreme disadvantages in production costs.

It is an object of the present invention to provide a highly productive and high-quality horizontal linearity correction coil that eliminates the abovedescribed conventional drawbacks.

In order to solve the above-described problems, the horizontal linearity correction coil according to the present invention includes a ferrite magnetic core that has flanges at upper, lower and intermediate portions, with each recess between the flanges combined with a winding core portion and one of the winding core portions being in a hollow shape, a winding wound around two winding core portions of the ferrite magnetic core, permanent magnets having different magnetic forces and magnetized in an axial direction of the ferrite magnetic core being combined to the flanges at both ends of the ferrite magnetic core, so that a magnetic saturation is generated in small inductance at the horizontal linearity correction coil portion that uses the hollow-shaped winding core portion.

With the above-described structure, the horizontal linearity correction coil formed by the hollow-shaped winding core portion generates a magnetic saturation in inductance smaller than the inductance at the horizontal linearity correction coil portion that is structured by the non-hollow shaped winding core portion, thereby to correct a distortion in the horizontal deflection of the cathode ray tube of which fluorescent screen is plane.

DESCRIPTION OF THE PREFERRED EMBODIMENT

One embodiment of the horizontal linearity correction coil according to the present invention will be explained below with reference to the drawings.

Figure 1:
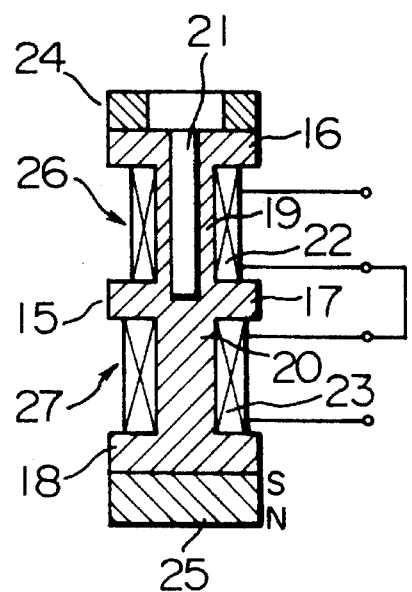
FIG. 1 is a cross sectional diagram for showing one embodiment of the horizontal linearity correction coil according to the present invention.
Figure 2:
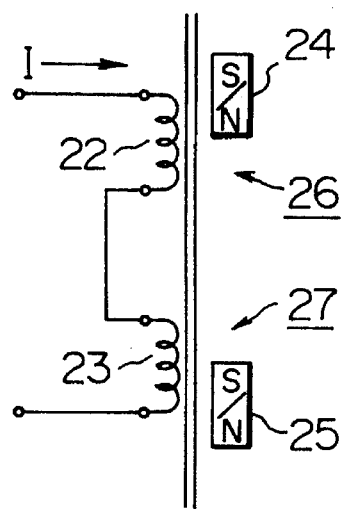
FIG. 2 is an equivalent circuit of the same.
Figure 3:
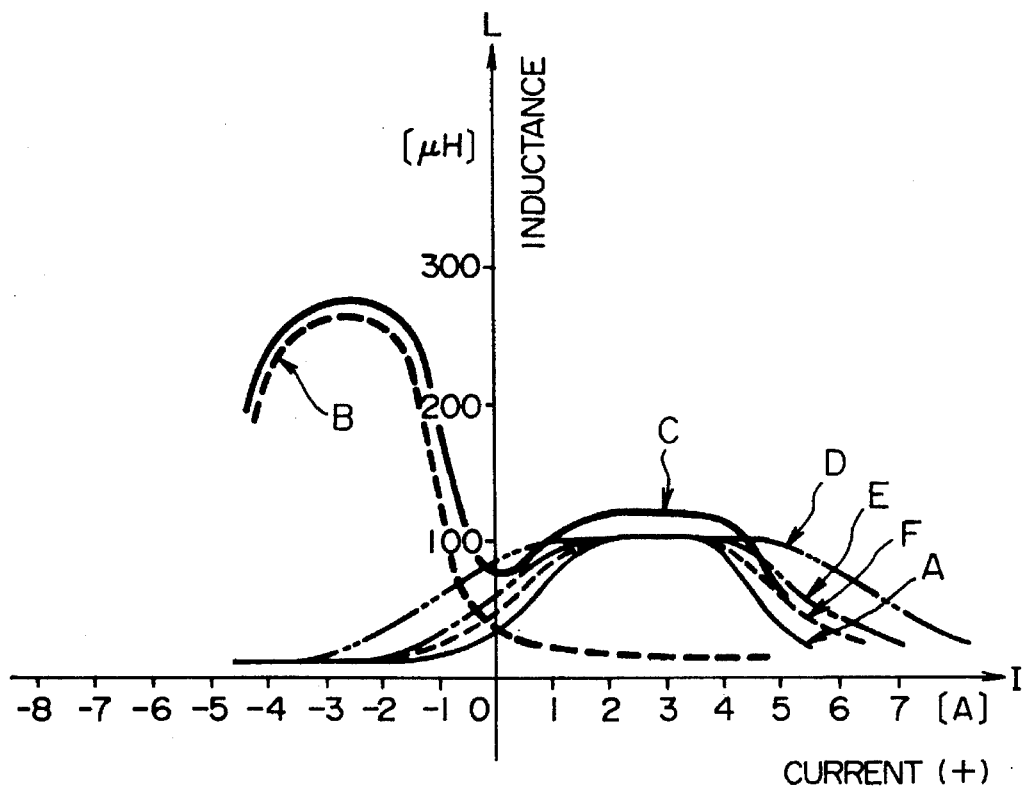
FIG. 3 is a characteristic diagram of the same.
Figure 4:
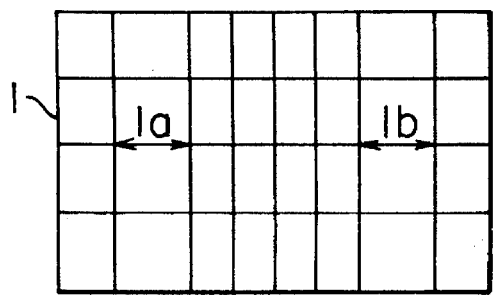
FIG. 4 is an explanatory diagram for explaining an image distortion of the cathode ray tube having a general wide deflection angle.

FIG. 1 is a cross sectional diagram for showing one embodiment of the horizontal linearity correction coil according to the present invention, FIG. 2 is an equivalent circuit thereof, and FIG. 3 shows a characteristic diagram thereof.

In the drawings, 15 designates a ferrite magnetic core, and the ferrite magnetic core 15 has an upper end flange 16, an intermediate flange 17, a lower end flange 18, a first winding core portion 19 for combining the upper end flange 16 and the intermediate flange 17, and a second winding core portion 20 for combining the intermediate flange 17 and the lower end flange 18. A hollow portion 21 is formed in the upper end flange 16 and the first winding core portion 19.

First and second windings 22 and 23 are wound around the winding core portions 19 and 20, respectively. The windings 22 and 23 are connected so that magnetic fluxes generated by the windings 22 and 23 are mutually in the different directions when the windings 22 and 23 are connected in series. The windings 22 and 23 are connected so that they are wound in the different directions when they are wound continuously.

First and second permanent magnets 24 and 25 made of a ferrite magnet or the like magnetized in the axial direction of the ferrite magnetic core 15 are combined to the end surfaces of the outsides of the upper end flange 16 and the lower end flange 18 of the ferrite magnetic core 15, respectively. The two permanent magnets 24 and 25 have different intensities of magnetic forces. The first permanent magnet 24 to be combined to the upper end flange 16 is a hollow-shaped donut type. This shape is made to open the space of the hollow portion 21 so that heat is not enclosed in this hollow portion 21.

As described above, as the ferrite magnetic core 15, the hollow portion 21 is provided in the first winding core portion 19 for combining the upper end flange 16 and the intermediate flange 17. A first horizontal linearity correction coil portion 26 comprises the first winding 22 wound around the first winding core portion 19 and the first permanent magnet 24 combined at the upper end flange 16. The second horizontal linearity correction coil portion 27 comprises the intermediate flange 17, the lower end flange 18, the second winding core portion 20, the second winding 23, and the second permanent magnet 25. Thus, the first horizontal linearity correction coil portion 26 that utilizes the first winding core portion 19 where the hollow portion 21 is formed can generate a magnetic saturation in small inductance. The hollow portion 21 is formed to have a thickness of about a half of the thickness of the intermediate flange 17 and the diameter of the hollow portion 21 is determined based on the diameter of the first winding core portion 19 by taking into account the magnetic saturation.

A detailed example of the horizontal linearity correction coil according to the present invention will be explained. The ferrite magnetic core 15 is fabricated so that the diameters of the upper end flange 16, the intermediate flange 17 and the lower end flange 18 are set to be 15 mm respectively, the diameters of the first and second winding core portions 19 and 20 are set to be 5 mm respectively, the diameter of the hollow portion 21 is set to be 3 mm, the thicknesses of the upper end flange 16, the intermediate flange 17 and the lower end flange 18 are set to be 2.2 mm respectively, the winding widths of the first and second winding core portions 19 and 20 are set to be 8.6 mm respectively, the whole length of the ferrite magnetic core 15 is set to be 23.8 mm, and the material of the ferrite magnetic core 15 is Ni—Zn soft ferrite.

A twisted set of about six copper lines, each line having a diameter of 0.22 mm, insulation coated with a polyurethane resin, is wound around the first and second winding core portions 19 and 20 around the ferrite magnetic core 15, to form the first and second windings 22 and 23.

The reason for using the set twisted lines for the first and second windings 22 and 23 is to prevent the cupper lines from heating due to the current flowing through them whose resistance components at high frequency, for example, at a horizontal deflection frequency 15.73 KHz of the television receiver increase because of the skin effect generated on the cupper lines.

The set twisted lines are wound by 71 turns around the second winding core portion 20 of the ferrite magnetic core 15 and the set twisted lines are wound by 42 turns around the first winding core portion 19 having the hollow portion 21, thereby to structure the first and second windings 23 and 22.

As the first and second permanent magnets 24 and 25 to be combined on both ends of the ferrite magnetic core 15, an isotropic dry molding barium hard ferrite is used, with diameters 15 mm for the first and second permanent magnets respectively, the thickness of 6.5 mm for the second permanent magnet 25, and the thickness of 2.5 mm for the first permanent magnet 24, and a hollow portion of a diameter 8 mm is formed at the center of the first permanent magnet 24.

Figure 8:
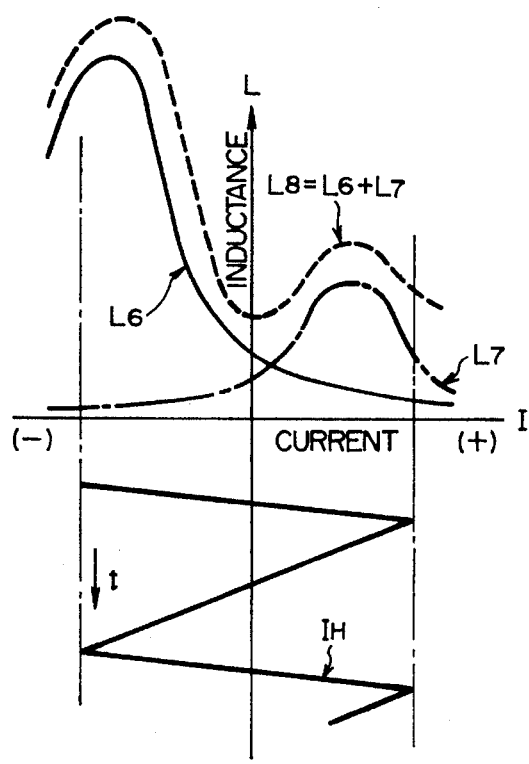
FIG. 8 is an electrical characteristic diagram of the two conventional horizontal linearity correction coils.
Figure 9:
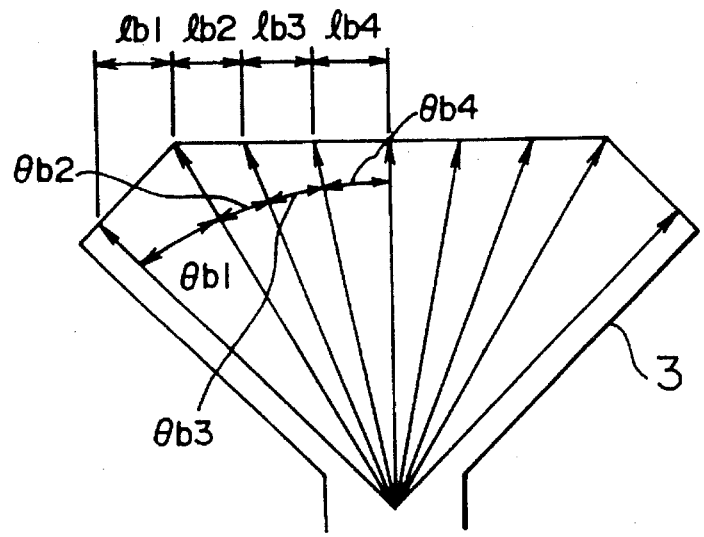
FIG. 9 is an explanatory diagram for showing an electromagnetic deflection of cathode rays of the cathode ray tube having a wide deflection angle when the two used.
Figure 10:
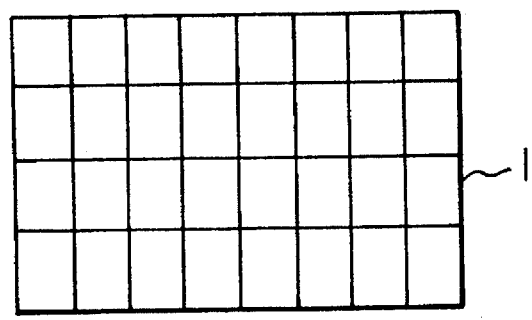
FIG. 10 is an explanatory diagram for showing conventional horizontal linearity correction coils are the image state of the cathode ray tube.
Figure 11:
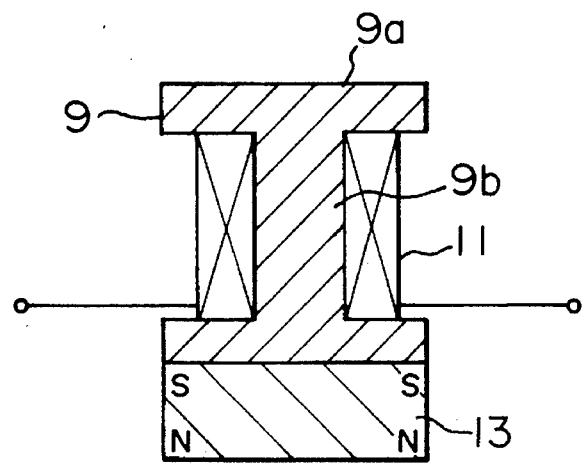
FIG. 11 is a cross sectional diagram for showing one of the conventional horizontal linearity correction coils.
Figure 12:
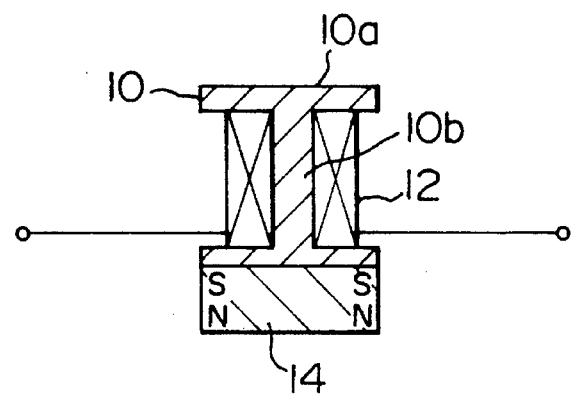
FIG. 12 is a cross sectional diagram for showing the other conventional horizontal linearity correction coil.

The equivalent circuit of the horizontal linearity correction coil having the above-described structure is as shown in FIG. 2 and the inductance versus current characteristic is as shown in FIG. 3. As a result, a combined characteristic similar to the one as explained for the prior-art example shown in FIG. 8 is obtained, and the lattice-shaped cross hatch pattern of the screen can take equal distances as shown in FIG. 10. In this case, it is assumed that a peak value of the inductance of the second horizontal linearity correction coil portion 27 is at least two times of a peak value of the inductance of the first horizontal linearity correction coil portion 26.

Figure 5:
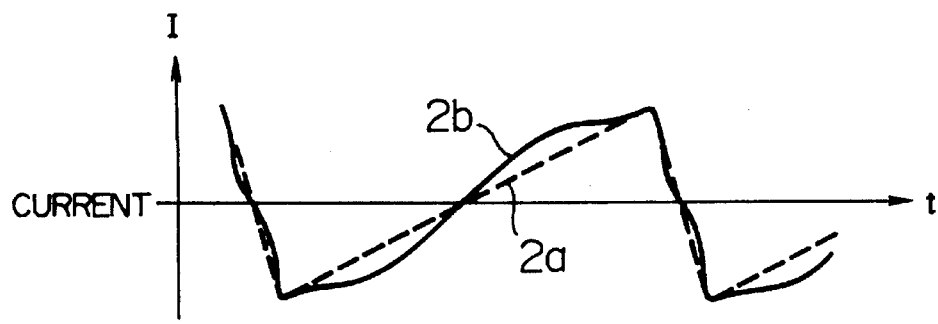
FIG. 5 is a characteristic diagram of a horizontal deflection current when two conventional horizontal linearity correction coils are used.
Figure 6:
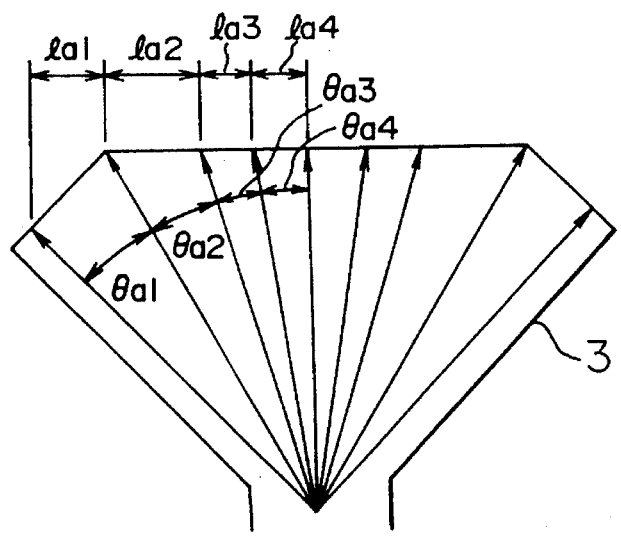
FIG. 6 is an explanatory diagram for showing an electromagnetic deflection of the cathode rays of the cathode ray tube having the general wide deflection angle.
Figure 7:
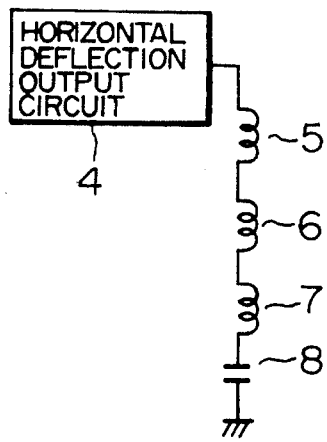
FIG. 7 is a circuit diagram for showing the conventional horizontal deflection circuit.

The reasons why the peak value of the inductance of the second horizontal linearity correction coil portion 27 is set at least two times of the peak value of the inductance of the first horizontal linearity correction coil portion 26 will be explained. The value of inductance of the horizontal linearity correction coil that is required for correcting a distortion of a horizontal deflection current caused by the horizontal deflection coil and the resistance component of the horizontal deflection circuit is about 15 percent of the value of inductance of the horizontal deflection coil at the portion of the maximum value at the minus side of the horizontal deflection current. It is assumed that this value is "L1". When the horizontal deflection current is linearly changed with respect to time t as the horizontal deflection current $2a$ shown in FIG. 5, the extension of the distance in the horizontal direction, which occurs in the cross hatch pattern on the screen at portions between the center and the left end portion and between the center and the right end portion, is about 1.5 times as described in the prior art in the cathode ray tube which has the wide deflection angle of 112 degrees and which has the plane fluorescent screen called a flat face. The value of the inductance of the horizontal linearity correction coil which is required for correcting this distortion is about 1.5 times of "L1", which is described above, in the middle between "0" of the horizontal deflection current and the maximum value at the minus side. Further, the value of the inductance of the horizontal linearity correction coil in the middle between "0" of the horizontal deflection current and the maximum value at the plus side is about 50 percent of "L1". Because the inductance component which is increased for correcting the distortion is required.

Concretely, when the value of the inductance of the horizontal deflection coil is for example 1300 μH, the value of "L1" is defined as following.

$$L1 = 1300 \times 0.15$$
$$= 195 \text{ [μH]}$$

In the cathode ray tube which is the size of 29 inches and has the wide deflection angle of 112 degrees and which has the plane fluorescent screen called a flat face, the deflection center of the electron beam is inside of the fluorescent screen by about 240 mm. When the electron beam is electromagnetically deflected at the conformal velocity, the distance $l_0$ in the horizontal direction of the fluorescent screen which the range from the deflection angle 0° to 33° is divided equally among three is defined as following.

$$l_0 = (240 \times \tan 33°)/3$$
$$\approx 52 \text{ [mm]}$$

Further, the distance $l_d$ in the horizontal direction of the fluorescent screen from the deflection angle 33° to 44° is defined as following.

$$l_d = 240 \times (\tan 44° - \tan 33°)$$
$$\approx 76 \text{ [mm]}$$

The ratio $l_d/l_e$ of the distance $l_d$ to the distance $l_0$ is defined as following.

$$l_d/l_0 = 76/52$$
$$\approx 1.46$$

Consequently, the value $L_{left}$ of inductance of the second horizontal linearity correction coil portion 27 in the middle between "0" of the horizontal deflection current and the maximum value at the minus side is defined as following.

$$L_{left} = L1 \times l_d/l_0$$
$$= 195 \times 1.46$$
$$\approx 285 \text{ [μH]}$$

Further, the value $L_{right}$ of inductance of the first horizontal linearity correction coil portion 26 in the middle between "0" of the horizontal deflection current and the maximum value at the plus side is defined as following.

$$L_{right} = (L1 \times l_d/l_0) - L1$$
$$= (195 \times 1.46) - 195$$
$$\approx 89.7 \text{ [μH]}$$

Thus, the peak value of the inductance of the second horizontal linearity correction coil portion 27 is set at least two times of the peak value of the inductance of the first horizontal linearity correction coil portion 26.

Referring to FIG. 3, "A" designates a characteristic of the first horizontal linearity correction coil portion 26 when the hollow portion 21 of the diameter 3 mm is formed in the first winding core portion 19, "B" designates a characteristic of the second horizontal linearity correction coil portion 27, and "C" designates a combined characteristic of both of the horizontal linearity correction coil portions 26 and 27. "D" shows a characteristic of the first horizontal linearity correction coil portion 26 when the hollow portion 21 is not formed in the first winding core portion 19, "E" shows a characteristic of the first horizontal linearity correction coil portion 26 when the hollowing portion 21 of a diameter 2 mm is formed in the first winding core portion 19, and "F" shows a characteristic of the first horizontal linearity correction coil portion 26 when the hollow portion 21 of a diameter 2.5 mm is formed in the first winding core portion 19.

As described above, by changing the diameter of the hollow portion 21 of the first winding core portion 19, the inductance versus horizontal deflection current characteristic of the first horizontal linearity correction coil portion 26 can be controlled so that the horizontal linearity correction coil according to the design of the television receiver can be provided.

As is clear from the above embodiment, the horizontal linearity correction coil according to the present invention can be achieved by using one horizontal linearity correction coil in stead of two independent horizontal linearity correction coils of different characteristics that are used conventionally, with an effect that productivity can be improved significantly and desired characteristics can be satisfied completely. Further, the horizontal linearity correction coil according to the present invention uses a small number of structural parts, requires a simple loading and can reduce a loading area, which results in a large contribution to the industry.

We claim:

1. A horizontal linearity correction coil comprising:

a ferrite magnetic core having a first flange at one end portion of said ferrite magnetic core, a second flange at an intermediate portion of said ferrite magnetic core, a third flange at other end portion of said ferrite magnetic core, a first winding core portion for combining said first flange and said second flange, a second winding core portion for combining said second flange and said third flange, and a hollow portion formed in said first flange;

first and second windings wound around said first and second winding core portions of said ferrite magnetic core, respectively;

first and second permanent magnets magnetized in an axial direction of said ferrite magnetic core and having different magnetic forces, combined respectively to said first and second flanges of said ferrite magnetic core;

a first horizontal linearity correction coil portion comprising said first winding and said first permanent magnet; and a second horizontal linearity correction coil portion comprising said second winding and said second permanent magnet;

said first horizontal linearity correction coil portion generating a magnetic saturation in small inductance.

2. A horizontal linearity correction coil according to claim 1 wherein said first winding and said second winding are connected in series and so that magnetic fluxes generate in different directions by said first and said second windings.

3. A horizontal linearity correction coil according to claim 1 wherein said first winding and said second winding are wound continuously and in different directions.

4. A horizontal linearity correction coil according to claim 1 wherein a peak value of inductance versus horizontal deflection current characteristic of said second winding is at least two times of a peak value of inductance versus horizontal deflection current characteristic of said first winding.

5. A horizontal linearity correction coil according to claim 1 wherein said first permanent magnet combined to said first flange has a hollow donut shape.

* * * * *